June 7, 1960  R. A. SHAW  2,939,649
AIRCRAFT HAVING WINGS WITH DUCTED FANS THEREIN
Filed April 22, 1957  2 Sheets-Sheet 1
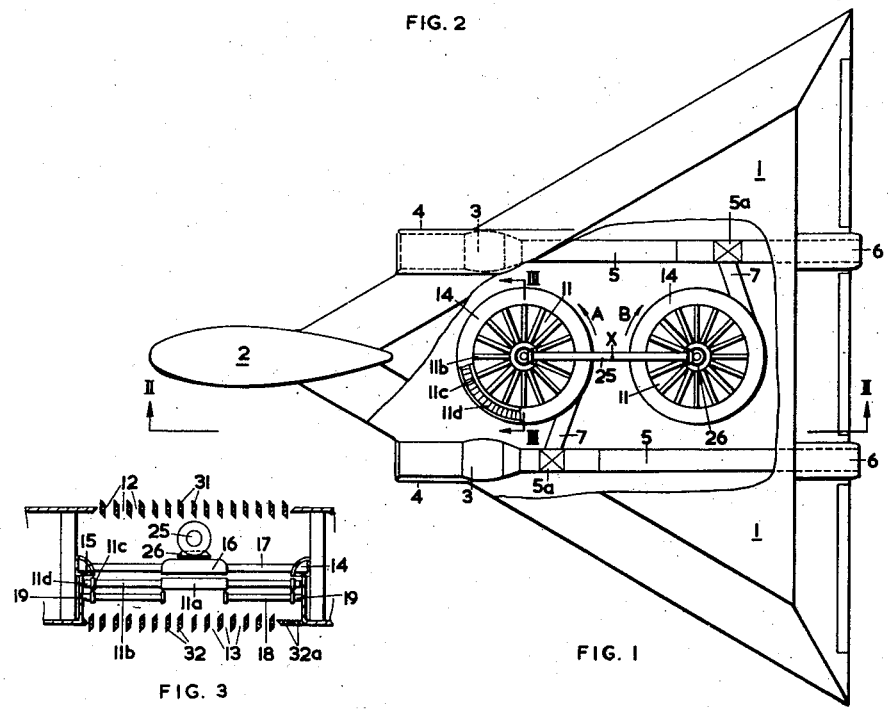
Inventor
RONALD ANDREW SHAW
By
Attorney

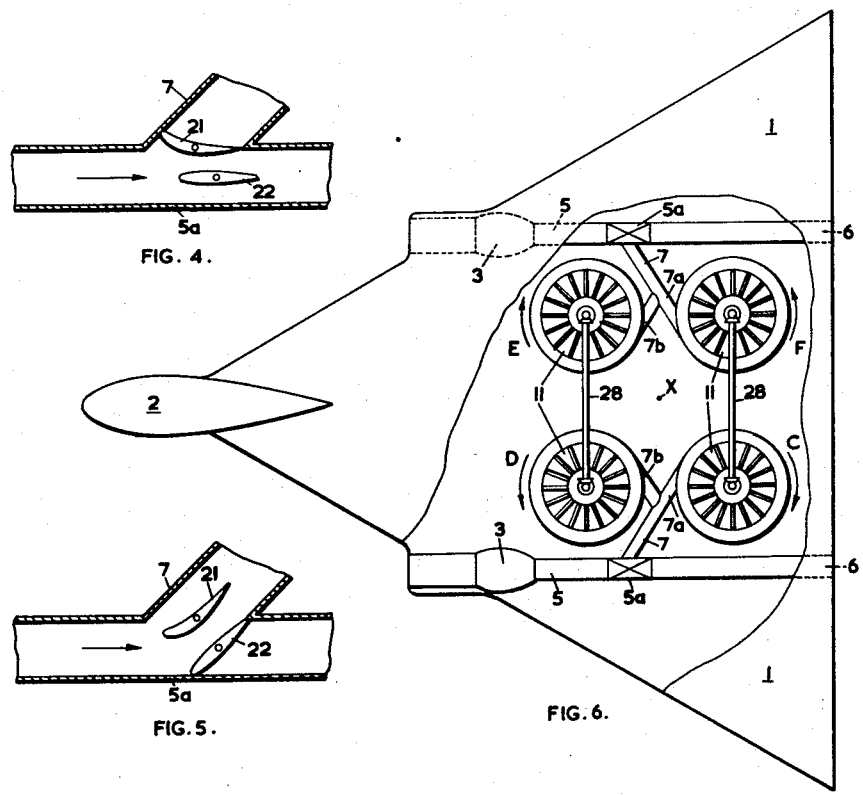

United States Patent Office 2,939,649
Patented June 7, 1960

2,939,649

AIRCRAFT HAVING WINGS WITH DUCTED FANS THEREIN

Ronald A. Shaw, Felden, Hemel Hempstead, England, assignor to the Minister of Supply in Her Majesty's Government of the United Kingdom of Great Britain and Northern Ireland, London, England Filed Apr. 22, 1957, Ser. No. 654,419

12 Claims. (Cl. 244—12)

This invention relates to aircraft and particularly though not exclusively to aircraft designed for high speed flight. Such aircraft normally have a high wing loading and hence very long landing and take-off runs are necessary. To curtail and possibly to eliminate landing and take-off runs, it is necessary to make provision for imparting a vertically upwardly directed thrust to the aircraft in addition to the aerodynamic lift afforded by the wings. The present invention is concerned with the type of aircraft, such as that described in copending application Serial No. 534,222, filed September 14, 1955, in which this thrust is provided by one or more fans mounted therein with their axes substantially vertical and arranged to discharge air streams in a downward direction.

According to the invention, an aircraft comprises at least two fans mounted with their axes substantially vertical and arranged to discharge air streams in a downward direction so as to impart an upward component of thrust to the aircraft, one fan being mounted forward and one aft of the centre of gravity of the aircraft, means being provided for varying the thrust produced by one fan relative to the thrust produced by the other. This variation serves to effect control of the aircraft in pitch.

Means may further be provided to deflect the air streams discharged from the two fans laterally in opposite senses at an angle to the vertical to effect control of the aircraft in yaw. In addition, means may be provided for displacing the lines of action on the air streams discharged by the fans to one side of the fore and aft centre line of the aircraft to effect control in roll.

There may be two fans only in the aircraft, both being mounted with their axes on the centre line of the aircraft. Alternatively, there may be groups of two or more fans mounted forward and aft of the centre of gravity of the aircraft, the fans of each group being arranged so that the resultant line of action of the air streams discharged thereby pass through the fore and aft line through the centre of gravity of the aircraft.

Two embodiments of the invention will now be described by way of example with reference to the accompanying drawings, of which:

Fig. 1 is a diagrammatic plan view of a jet propelled aircraft, part of the upper surface of the aircraft being shown as broken away to show the interior construction;

Fig. 2 is a side view of the aircraft taken on the line II—II in Fig. 1;

Fig. 3 is a fragmentary sectional view taken on the line III—III in Fig. 1;

Figs. 4 and 5 show a detail of one of the engine jet pipes;

Fig. 6 is a diagrammatic plan view of another jet propelled aircraft, part of its upper surface being shown as broken away to show the interior construction.

In Figs. 1 and 2, a small high speed aircraft comprises a wing 1 of delta configuration with high sweepback and a nacelle 2 for the pilot's cockpit extending forwardly from the apex of the delta. The aircraft is powered by two gas turbine jet propulsion engines 3, symmetrically disposed one on each side of the aircraft fore and aft centre line, and partly buried in the wing 1 and partly enclosed by nacelles 4 extending forwardly from the leading edge thereof. The engines draw in air through intakes at the front of the nacelles 4 and discharge propulsive jet streams through rearwardly directed jet pipes 5 terminating in jet nozzles 6 at the rear of the aircraft. Each jet pipe 5 is circular in cross-section for most of its length, but includes a part 5a of rectangular cross-section, the circular and rectangular parts being joined by connecting portions which progressively change in shape without substantial change of cross-sectional area. Each rectangular part 5a is provided with a branch pipe 7 which intersects the jet pipe at an acute angle so that the entry to the branch faces upstream relative to the jet stream. Means are provided for diverting the jet stream in each jet pipe 5 into its respective branch pipe as will be explained below.

The aircraft is further provided with two similar fans 11 mounted within the wing 1 between the jet pipes 5 with their axes substantially vertical and symmetrically spaced along the aircraft fore and aft centre line, one forward and one aft of the aircraft centre of gravity X. The fans are arranged to draw in air through apertures 12 in the upper surface of the aircraft wing 1 and to discharge air streams vertically downwardly through apertures 13 in the wing lower surface so as to impart upthrust to the aircraft (see Fig. 3). Each fan rotor comprises a hub 11a, a row of axial flow fan rotor blades 11b extending outwardly therefrom, and a shroud ring 11c connecting the tips of the rotor blades. Each rotor further has a row of axial flow turbine rotor blades 11d mounted on the outer surface of the shroud ring, and immediately above the turbine rotor blades is an annular turbine inlet volute 14 having a tangential inlet connected to one of the branch pipes 7 and a downwardly facing nozzle outlet provided with turbine nozzle vanes 15 cooperating with the turbine rotor blades 11d. The rotor is carried in bearings in a fairing 16 supported from the volute 14 by a row of axial flow fan inlet stator blades 17 extending across the fan inlet. Rows of fan and turbine stator blades 18, 19 are provided on the downstream side of the rotor blades.

The arrangement for diverting the exhaust gases from jet pipe is generally similar to the device described in said co-pending application Serial No. 534,222 and comprises two butterfly valve discs 21, 22 (see Figs. 4 and 5). The pivotal axes of these discs lie transverse to the jet pipe 5 and the branch 7 and are so chosen as to minimise the moments which must be exerted to turn the discs and to control their position. For normal forward flight, the disc 21 closes the entry to the branch 7 while the disc 22 lies edge on to the jet stream which is discharged rearwardly through the jet nozzle 6 as a propulsive jet stream (see Fig. 4.). For take-off and landing, and in hovering flight, the discs are turned about their pivotal axes by actuating means (not shown) such as hydraulic jacks so that the disc 22 closes the jet pipe while the disc 21 opens the entry to branch 7 (see Fig. 5), this disc being somewhat curved to guide the jet stream into the branch. The jet stream from the engine is accordingly diverted into the branch 7 and flows through the turbine inlet volute 14 to drive the turbine rotor blades 11d which thereby drives the fan to produce upthrust of the aircraft.

The exhaust gases from the turbine are also discharged downwardly and so serve to augment the upthrust of the aircraft. The gases may be discharged with an inwardly directed component of motion so that they mix rapidly with the cool air streams from the fan.

In transition from vertical to horizontal flight and vice versa, both forward and upthrust may be required, and so an intermediate position of the discs 21, 22 may be selected.

It will be seen that the two fans are driven one by the exhaust gases diverted from each jet pipe. The two fan rotors are constrained to rotate at the same speed by a connecting shaft 25 and bevel gearing 26. This arrangement also makes it possible to drive both fans from one engine in the event of engine failure. The fans are constrained to rotate in opposite directions as indicated by the arrows A, B to balance out gyroscopic sets.

Under take-off and landing conditions and when hovering and in transition to and from normal forward flight, it is particularly important to be able to control the aircraft in pitch. This is done by varying the thrust produced by the air streams discharged by the two fans relative to one another. The fan stator inlet blades 17 of the two fans are mounted for angular movement about radial axes in known manner (for example as described in co-pending application Serial No. 576,700 filed April 6, 1956) and are linked together so that as the blades 17 of one of the fans are turned in one sense, the stator blades 17 of the other fan are turned in the opposite sense, so that the thrust of the air stream from one fan is reduced while that from the other is increased by a corresponding amount. Thus a large turning moment about a horizontal transverse axis through the aircraft centre of gravity can be set up.

In this particular arrangement there is no need to adjust the turbine nozzle to allow for changes in the thrust of the two fans, as the excess power from the turbine on the fan the thrust of which is reduced will be transferred to the other fan through the shaft 25. Since the fan speed must remain constant due to the constraint applied by the shaft, the thrust variation produced by turning the stator blades will be immediate and substantially instantaneous control can be obtained.

In an alternative embodiment the fan rotor blades 11b may be similarly angularly adjustable.

The apertures 12, 13 in the upper and lower surfaces of the wing can be closed when the fans are not in use by pivoted vanes or slats 31, 32 extending in a fore and aft direction. These slats can be turned from the open position shown in which they lie edge on to the air stream to a closed position in which they lie flush with the surfaces of the wing to close the apertures. The slats 32 for the lower aperture can further be set in intermediate positions to deflect the air stream at an angle to the vertical, the air stream from one fan being deflected to one side of the aircraft fore and aft centre line and the air stream from the other fan being diverted to the other side, the slats of the two fans being linked to move in opposite senses. In this way the aircraft can be controlled in yaw. In addition, the slats 32a adjacent each side of each fan aperture are operable independently of the other slats to blank off a small segment at the side of the aperture (as shown in Fig. 3). In this way, the line of action of the air streams discharged by the fans can be displaced to one side or the other of the aircraft fore and aft centre line so as to afford control in roll.

In an alternative arrangement, the slats 32 in the apertures 13 in the undersurface of the aircraft extend transversely of the aircraft and are pivoted to deflect the airstreams discharged by the fans either forward or aft to give horizontal components of thrust on the aircraft. In addition, the slats may be divided into two halves along the fore and aft centre line of the aircraft and the two halves can be operated differentially so that half of each air stream discharged by a fan is deflected forwardly and half aft, thus giving rise to turning and rolling moments on the aircraft.

As will be seen from Fig. 2, the aircraft wing 1 has a cross-section designed for supersonic flight, having flat and parallel upper and lower surfaces, and sharply pointed leading and trailing edges. The cross-section is thus of the form of a regular hexagon. The fan inlet and discharge apertures lie in the flat surfaces so that the slats do not require to be curved to conform to the profile of the wing as might otherwise be the case.

In a possible further alternative arrangement, the branches 7 from the jet pipes may be further branched so that each is connected to each volute 14, and each fan 11 is driven by the exhaust gases from both engines. In this case, the connecting shaft 25 might be omitted, but to maintain substantially constant speed of the fans for given conditions of temperature and pressure at the turbine inlet, the adjustable fan inlet stator vanes 17 may be so linked to a variable area partial admission nozzle to the turbine rotor blades 11d (which will accordingly be of the impulse type) that when the stator blades are turned in a sense to increase the air inlet angle to the fan rotor blades, the turbine nozzle area is increased and vice versa. Such an arrangement is described in said co-pending application Serial No. 576,700.

In the arrangement just referred to, it would also be possible to vary the turbine nozzle area or to adjust the turbine nozzle inlet vanes to vary the speed and hence the thrust of the two fans.

The aircraft shown in Fig. 6 is generally similar to that of Fig. 1 and the same reference numerals have been used for corresponding parts. In the arrangement shown however, the aircraft is provided with four similar fans 11 as previously described, two mounted on each side of the aircraft and symmetrically disposed with respect to the aircraft fore and aft centre line and centre of gravity X so that their resultant line of action passes through the centre of gravity. The engines 3 and their jet pipes 5 are mounted outboard of the fans and each jet pipe 5 has a branch 7 into which the exhaust gases can be diverted by the device shown in Figs. 4 and 5, and this branch leads into two further branches 7a, 7b so that it supplies both of the fans on the corresponding side of the aircraft. The two fans on each side of the aircraft rotate in opposite senses as indicated by the arrows C, D, E, F, and the two forward fans and two rearward fans are linked by bevel gears and shafts 28, so that they are constrained to rotate at the same speed and so that all four fans will continue in operation in the event of the failure of one engine.

For controlling the aircraft in pitch, provision is made for varying the thrust of the two forward fans relative to the thrust of the two rearward fans. This again may be done by altering the setting of the fan inlet stator blades 17. Since the blades of the linked fans are in this embodiment to be turned in the same sense, they are preferably further linked to the turbine nozzle as in said co-pending application Serial No. 576,700 to maintain the fans at constant speed. Control of the aircraft in roll is effected by differential operation of the fans of each pair. This again is effected by adjustment of the fan inlet stator blades in opposite senses, but since the fans are linked to rotate at the same speed, no adjustment of the turbine nozzle is required. The apertures for the discharge of the airstreams in the aircraft undersurface are provided with transversely extending slats which can be operated in unison in the same sense to deflect the airstreams forward or aft to give horizontal components of thrust. Further the slats in the apertures on opposite sides of the aircraft fore and aft centre line can be operated differentially to control the aircraft in yaw.

Instead of being driven by exhaust gases diverted from the jet pipes, the fans may be driven by compressed air supplied from auxiliary compressors driven by the engines or from the compressors of the engines themselves, or in any other suitable manner.

In the above described embodiments, the fans are all of the same size and so the connecting shafts, 25, 28 constrain the linked fans to rotate at the same speed. If however the fans are of different sizes, they will not necessarily be required to rotate at the same speed, but will be constrained to rotate so that their rotational speeds are in same pre-determined ratio to one another.

To reduce the depth of the wing, the connecting shaft 25, 28 may be led to the rotor shaft through one of the inlet guide vanes 17, the bevel gearing being accommodated in the fairing 16.

I claim:

1. An aircraft comprising at least two fans mounted with their axes substantially vertical and arranged to discharge air streams in a downward direction so as to impart an upward component of thrust to the aircraft, one fan being mounted forward and one aft of the centre of gravity of the aircraft, turbine rotor blades drivingly connected to each fan rotor, at least one jet propulsion engine having a jet pipe for the rearward discharge of a propulsive jet stream for normal forward flight, a branch pipe of said jet pipe for conducting a jet stream to said turbine rotor blades, deflecting means at the junction of the branch pipe with the jet pipe movable from a position closing the branch pipe while leaving the jet pipe open to a position blocking the jet pipe and deflecting the jet stream into the branch pipe, whereby said fans are driven by the jet stream diverted from said jet pipe, means being provided for varying the thrust produced by one fan relative to the thrust produced by the other.

2. An aircraft according to claim 1 wherein each fan comprises a plurality of angularly adjustable blades.

3. An aircraft according to claim 1 comprising means coupled to said fan rotors to constrain said fan rotors to rotate at speeds which are in a predetermined ratio to one another.

4. An aircraft according to claim 1 comprising means to deflect the air streams discharged from the two fans laterally in opposite senses at an angle to the vertical.

5. An aircraft according to claim 4 wherein the aircraft has apertures in its lower surface for the discharge of the air streams, each aperture being provided with slats extending in a fore and aft direction and moveable to a position for deflecting the stream at an angle to the vertical.

6. An aircraft according to claim 5 wherein the slats are moveable to a position in which they close the aperture.

7. An aircraft according to claim 1 comprising means for displacing the line of action of the air streams discharged by the fans to one side of the aircraft fore and aft centre line.

8. An aircraft according to claim 6 wherein at least one slat adjacent to the side of the aperture is moveable independently of the remaining slats to a position in which it blanks off a segment at that side of the aperture.

9. An aircraft comprising at least two fans mounted with their axes substantially vertical on the fore and aft centre line of the aircraft and arranged to discharge air streams in a downward direction so as to impart an upward component of thrust to the aircraft, one fan being mounted forward and one aft of the centre of gravity of the aircraft, means for varying the thrust produced by one fan relative to the thrust produced by the other, two jet propulsion engines having jet pipes for the rearward discharge of propulsive jet streams, turbine rotor blades drivingly connected to each fan rotor, the jet pipes lying one on each side of the fans, and means operable at will for diverting the jet stream from one jet pipe to the turbine rotor blade of one of the fans whereby said one of the fans is driven by the deflected jet stream from said one jet pipe and from the other jet pipe to the turbine rotor blades of the other of the fans whereby said other of the fans is driven by the deflected jet stream from said other jet pipe.

10. An aircraft comprising two groups of fans with their axes substantially vertical and arranged to discharge air streams in a downward direction so as to impart an upward component of thrust to the aircraft, one group mounted forward and one aft of the aircraft centre of gravity, the fans of each group being mounted so that their resultant line of action passes through the fore and aft centre line of the aircraft, two jet propulsion engines having jet pipes for the rearward discharge of propulsive jet streams, the jet pipes lying one on each side of the fans, and means operable at will for diverting the jet stream from one jet pipe to the turbine rotor blades of the fans in one group whereby said one group of fans is driven by the deflected jet stream from said one jet pipe and from the other jet pipe to the turbine rotor blades of the fans in the other group whereby said other group of fans is driven by the deflected jet stream from said other jet pipe.

11. An aircraft according to claim 10 comprising means coupled to the fans of each group to constrain the fan of each group to rotate at speeds which are in a pre-determined ratio to one another.

12. An aircraft comprising at least two fans mounted with their axes substantially vertical and arranged to discharge air streams in a downward direction so as to impart an upward component of thrust to the aircraft, one fan being mounted forward and one aft of the center of gravity of the aircraft, turbine rotor blades drivingly connected to each fan rotor and mounted around the periphery thereof, at least one jet propulsion engine having a jet pipe for the rearward discharge of a propulsive jet stream for normal forward flight, a branch pipe of said jet pipe for conducting a jet stream to said turbine rotor blades, deflecting means at the junction of the branch pipe with the jet pipe movable from a position closing the branch pipe while leaving the jet pipe open to a position blocking the jet pipe and deflecting the jet stream into the branch pipe, whereby said fans are driven by the jet stream diverted from said jet pipe, means being provided for varying the thrust produced by one fan relative to the thrust produced by the other.

References Cited in the file of this patent

UNITED STATES PATENTS

| Number | Name | Date |
|---|---|---|
| 1,408,496 | Bennett | Mar. 7, 1922 |
| 1,786,017 | Matta | Dec. 23, 1930 |
| 1,818,116 | Cordy | Aug. 11, 1931 |
| 2,501,078 | Newcomb | Mar. 21, 1950 |
| 2,610,005 | Price | Sept. 9, 1952 |
| 2,734,699 | Lippisch | Feb. 14, 1956 |
| 2,774,554 | Ashwood et al. | Dec. 18, 1956 |
| 2,807,428 | Wibault | Sept. 24, 1957 |

FOREIGN PATENTS

| Number | Country | Date |
|---|---|---|
| 1,120,545 | France | Jan. 12, 1955 |